3,032,514
PROCESS FOR PREPARING HIGH DENSITY FLUID ALUMINA BASE CATALYST MATERIAL

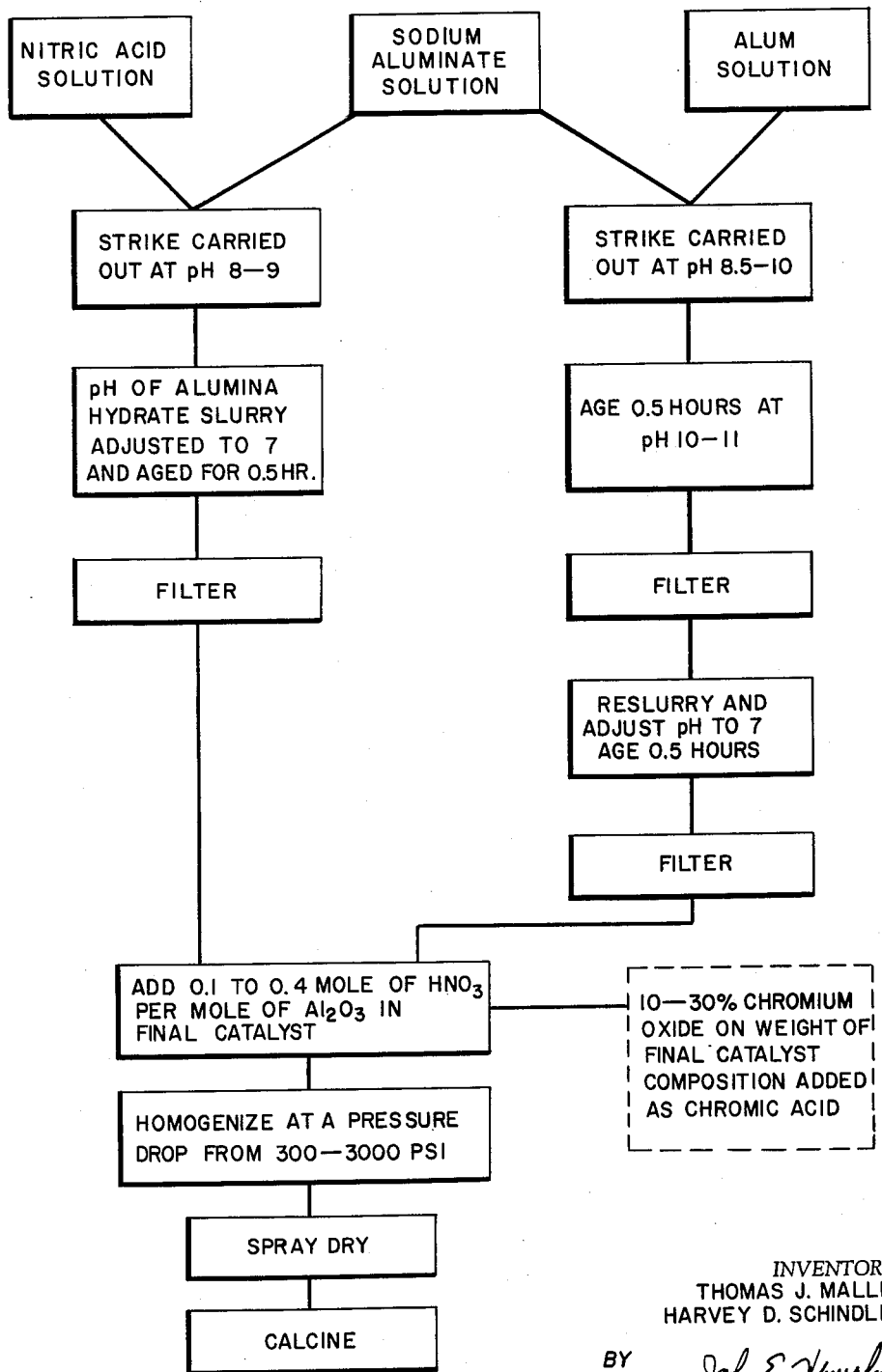

Thomas J. Malley, Stamford, and Harvey D. Schindler, Darien, Conn., assignors to American Cyanamid Company, New York, N.Y., a corporation of Maine.
Filed Nov. 15, 1957, Ser. No. 696,664
6 Claims. (Cl. 252—465)

This invention relates to the method of preparing gels which can be converted to calcined alumina and fluid alumina base catalysts of high density, surface area and good attrition resistance.

The invention also includes certain catalyst compositions in which the catalyst density, attrition resistance, and other characteristics are controlled to produce optimum performance in particular catalytic processes such as in the dehydrogenation of hydrocarbons, catalytic reforming, hydrodesulfurization of petroleum fractions and the like, and also to the processes employing these catalysts.

As is generally known, a wide variety of catalysts are now employed in commercial use in which an activating metal or metal oxide is supported on or impregnated in and throughout an alumina base.

One of the principal objects of the present invention is to provide a manufacturing process for the production of such alumina gels suitable as a base in the preparation of such catalyst compositions, which process results in the high density (at least 0.8 cc. per gram) and attrition resistance of the alumina and/or impregnated alumina and thus of the finished catalyst material.

A further object of the present invention is the provision of such a method that is particularly well adapted for large scale manufacture, including the removal of alkali metal compounds and other impurities from the alumina gel.

A still further and special object is to provide a fluid alumina base chromium oxide catalyst having a calcined ABD of at least 0.8 gram per cubic centimeter. Catalysts of this type are principally employed in dehydrogenation, as for example, in the conversion of paraffins to olefins and diolefins, such as n-butane to butene or butadiene.

With respect to the term "Apparent Bulk Density," this is determined by the method described in "Test Methods for Synthetic Fluid Cracking Catalysts" by the American Cyanamid Company Refinery Chemicals Department, 1957.

Additional objects and advantages will become apparent from the detailed description of the present invention set forth hereinbelow, including the specific examples therein.

Alumina of suitable activity for catalytic purposes is frequently prepared by precipitation from a water solution of a water-soluble aluminum compound which may be either an aluminum salt such as aluminum sulfate, aluminum nitrate, aluminum chloride and the like, or an alkali metal aluminate such as sodium or potassium aluminate. When hydrated alumina is prepared by ordinary precipitation procedures, and is dried a light, fluffy product of low apparent bulk density (ABD) usually within the range of about 0.2 and 0.3 gram per cc. is obtained. Further, when such material is employed as a fluid type catalyst or as a base for fluid type catalysts, the attrition resistance of the catalyst is poor. Thus, it is found that during the use of such low density catalysts in most commercial fluid type reactors the attrition resulting from the contacts between the particles results in a rapid reduction in particle size to a fineness whereby the value of the material for catalytic purposes is lost because of the inability of the cyclones or other collection devices to retain the catalyst in the reactor.

It has been found that alumina hydrate prepared from sodium aluminate and alum or sodium aluminate and a mineral acid, in which certain controlled conditions are employed during the preparation of a precipitated hydrated alumina, including a strike pH of between 9 and 10.5, and/or certain controlled conditions subsequent to the formation of the hydrated alumina gel, such as ageing at a pH of between 10 and 11, that hydrated alumina is prepared, which is fully responsive to homogenization, and thus provides a material capable of being converted by homogenization or comminution to a material of high density.

While a procedure of this type is eminently satisfactory for most purposes, and is disclosed in a copending application, Serial No. 660,000, filed May 17, 1957, now U.S. Patent No. 2,980,632, working in these high pH ranges, either during strike or precipitation, or during ageing, increases handling difficulties, such as removal of impurities, difficulty in filtering, and the like. Further, when large or commercial batches of materials are prepared according to such a process, pH regulation becomes increasingly difficult to control, and slight variations outside of a specific, narrow, operable range for a given system, either sodium aluminate-alum or sodium aluminate-mineral acid may result in the loss of the batch.

Thus, according to the present invention, in a surprising manner, a method is provided which overcomes these shortcomings, which method is considerably more flexible than that generally referred to hereinabove.

According to the present invention, when certain specific and controlled conditions are employed during the preparation of a precipitated hydrated alumina, or by employing certain controlled conditions subsequent to the formation of the hydrated alumina gel, whereby alumina or alumina base catalysts may be rendered at least partially responsive to homogenization, that the material may be rendered fully responsive to homogenization and attrition resistance of the alumina or alumina base catalyst may be substantially and unexpectedly improved by the addition prior to homogenization of an inorganic acid selected from the group consisting of nitric and hydrochloric acid. Of the suitable acids, nitric is greatly preferred.

By the term "at least partially responsive to homogenization" as it and similar expressions are used herein, it is meant that the employment of certain controlled conditions of strike and/or ageing, to be defined more fully hereinafter, will not provide a material having an ABD of at least 0.8 cc. per gram when comminuted as by homogenization, employing from between 300 and 3000 pound pressure per square inch, and spray dried.

By the term "fully responsive to homogenization" as it or similar expressions are employed herein, it is meant that the material, when prepared in a manner such as that disclosed in the present invention, is homogenized and spray dried, a product having an ABD of at least 0.8 cc. per gram results. Here it may be noted that if the material is not fully responsive by employing the process as described generally above or in detail hereinafter, the acid modification employed in the present process functions to substantially increase the ABD and attrition resistance of the spray dried material in excess of that obtainable without acid modification.

The alumina hydrate which is at least partially responsive to homogenization and which is to be acid treated prior to homogenization to increase its responsiveness, may be prepared either by precipitating from an aqueous solution (preferably sodium aluminate) under specific alkaline conditions to be set forth hereinafter, or it may be prepared by ageing a precipitated alumina gel or hydrated alumina under specific alkaline conditions at a pH higher than that of its precipitation, or a combination of specific strike conditions and ageing conditions may be employed.

In general, and without regard to the specific precipitating agent (alum or mineral acid) the hydrated alumina which is acid treated prior to homogenization in accordance with the process of the present invention may be obtained by precipitating from a water-soluble aluminum compound (preferably sodium aluminate) within a pH range between 8.0 and 10.0. When these conditions are maintained, the alumina is precipitated in a form in which it can be filtered at reasonably good filtration rates and washed free from contaminating salts. Thereafter, the hydrated alumina is aged, filtered, acid modified and, if desired, promoters added. Then the hydrated alumina particles can be broken down to an increasing extent by increasing the severity of comminution, as by homogenization. After homogenization, the hydrated alumina is spray dried and calcined. The degree of response of the hydrated alumina to comminution, to some extent, increases with increasing pH values within the above range, but at pH values above 10.0 the formation of slimes is noted and control of density by homogenization is erratic and unpredictable. One of the primary points in obtaining alumina of high density is therefore the adjustment of the hydrated alumina precipitation or strike within the range of 8.0 and 10.0.

The hydrated alumina may be rendered more responsive to homogenization and may also be prepared by ageing a hydrated alumina slurry under alkaline conditions. Thus, it has been found that by ageing the slurries under more strongly alkaline conditions than those used in the precipitation of the hydrated alumina, and within the pH range of 10–11, that responsive alumina is prepared.

A further control employed in obtaining a high spray-dried density of the alumina relates to the extent or severity of the comminution of the hydrated alumina or impregnated hydrated alumina. A preferred method of comminution of the hydrated alumina or alumina base catalyst material is by passing it through a homogenizer. This step may accurately be described with reference to an ordinary spring-loaded homogenizing valve. In the present specification and claims, the extent of homogenization will therefore be defined as that corresponding to the homogenization obtained by passing the hydrated slurries through a valve at a defined pressure drop. In accordance with the present invention, this pressure drop should be a value from between about 300 to about 3000 lbs. per square inch.

In accordance with the present invention, the hydrated alumina may be prepared by precipitating alumina from a system employing an alkali metal aluminate and alum (aluminum sulfate) or from a system employing an alkali metal aluminate and nitric acid.

When the alkali metal aluminate-alum system is employed in the preparation of the hydrated alumina, the alumina is precipitated from the water-soluble aluminate compound at a pH of from between 8.5 and 10, followed by ageing in a pH within the range of from 10–11. Ageing should be continued for at least 0.25 to 0.5 hour, and may be continued for times in excess of one hour.

When the hydrated alumina is obtained employing an alkali metal aluminate and mineral acid, such as nitric acid, the alumina is precipitated at a pH between 8 and 9, followed by ageing at a neutral pH (6.5–8) for a time period of from 0.25 to 0.5 hour and more.

The response of the alumina made by either of the above processes to the acid treatment followed by comminution and densification through a homogenizer can also be increased to some extent by controlling the percent of solids in the initial alumina gel strike. However, if strike solids are below 4%, the filtering and washing characteristics of the alumina are impaired because of the formation of slimes and it may become difficult or impossible to remove sodium compounds and other impurities to the extent necessary for catalytic purposes. For most purposes, the strike solids are therefore maintained between about 5 and 8 with a top limit of about 9%; at higher strike solids the viscosity is such that it is difficult or impossible to maintain uniform pH conditions throughout the strike tank. Efficient and powerful agitation, as by the use of turbine agitators, is particularly desirable at high strike solids to assist in maintaining a pH at uniform level.

The principal control to be used in the preparation of high density spray-dried alumina and the alumina base catalyst material resides in the addition of a suitable acid selected from the group consisting of nitric acid and hydrochloric acid in amounts within the range of 0.1 to 0.4 mole of said acids per mole of hydrated alumina as $Al_2O_3$ in the final filter cake derived from the high pH strike. Preferably, the amount of acid employed is less than 0.3 mole and desirably is between 0.1 and 0.3 mole.

While no critical conditions need to be observed in the acid addition stage with respect to time of addition or rate of addition, it is normally preferred to add the acid at a uniform rate while stirring the hydrated alumina or impregnated hydrated alumina, in order to avoid undesirable local effects. After the addition of the acid, which may be to a washed, high pH filter cake, no further holding period is required and the alumina hydrate or gel which may be impregnated with activators is ready for comminution as by homogenization.

The alumina hydrate rendered responsive to homogenization by the above-described feature may be impregnated with activators prior to the addition of acid and comminution. As examples of suitable activators, platinum or palladium, molybdenum oxide, with or without oxides of cobalt or nickel, tungstic oxide, chromium oxide, with or without potassium oxide and/or silica, may be mentioned. Alternatively, the activators may be added simultaneously with the acid or subsequent to the acid addition.

In the case of $MoO_3$ activated catalyst, water-soluble salts such as ammonium molybdate may be employed as the source in an amount sufficient to provide from between 8 and 20% thereof. In a cobalt oxide-molybdic oxide activated catalyst, the cobalt oxide may be added as a water-soluble cobalt salt, such as cobalt nitrate, in an amount sufficient to provide between 1 and 5% by weight of cobalt oxide in the final catalyst and preferably about 3% and water-soluble molybdenum-containing salt such as ammonium molybdate in an amount sufficient to provide from between 8 and 25%, and preferably 15%, by weight of $MoO_3$ of the final catalyst composition.

Thereafter, the acid treated hydrated alumina gel or hydrated alumina base gel catalyst material is homogenized as by passing the material through a homogenizer, such as a spring-loaded homogenizing valve, through which the alumina gel or promoter impregnated alumina gel is forced, as by a pressure pump.

The homogenized material is then dried, as by spray drying, drum drying, tray drying or the like. Preferably, the catalyst materials of the present invention are spray dried. For spray drying, any suitable spray drier may be employed. One that has been employed with success is described in U.S. Patent No. 2,644,516, dated July 7, 1953. Although gas inlet temperatures up to 1300° F. have been used successfully, the temperature of the drying gas entering the spray drying chamber is preferably controlled within the range of about 500 to 1000° F. so that the hydrated alumina or alumina base catalyst material will be converted into a set partially dehydrated gel during the drying procedure. Spray drying usually results in a moisture content of between 20 and 40% or conversely a solids content within the range of 60–80%.

The dried material is thereafter calcined, preferably at temperatures of between 1250° F. and 1350° F. to substantially completely remove the volatile content of the catalyst and normally the catalyst material is subjected to such temperature for an additional one or two hours to completely convert the catalyst components to their oxide or active form.

The final product may be alumina, suitable for use as a catalyst base or for other purposes, or an alumina base fluid catalyst. The product is possessed of desirable properties, including a density of at least 0.8 gram per cc., and excellent attrition resistance.

It has been recognized in the past that acids of the type contemplated for use in the present invention are in fact useful for improving the attrition resistance of alumina and alumina base catalysts. Thus, in U.S. Patent No. 2,768,125 the addition of such acids over a relatively wide range to alumina gels is set forth in detail. As in that reference, it is disclosed that certain organic acids, as for example, acetic, formic, glycolic, oxalic and the like, are unsuitable for use as hardening agents or agents whereby attrition resistance can be obtained.

It has been found in accordance with the present invention that the lines established there with respect to suitable acids are substantially coincident with those which may be employed in the present process. Thus, for example, in accordance with the present process, organic acids such as acetic, formic, glycolic, oxalic and the like are generally unsatisfactory.

While this described procedure is suitable for alumina base material precipitated at substantially neutral pH, and where the catalyst material has not been rendered at least partially responsive to homogenization, after the catalyst material has been rendered partially responsive to homogenization, by employing high alkaline strikes or ageing conditions, it would be expected that the addition of acid prior to homogenization would function to offset the pre-conditioning by possibly converting the catalyst material to the form of catalyst material prepared by conventional neutral or slightly alkaline pH strikes, which materials are not responsive to homogenization.

An embodiment of the present invention will now be described in greater detail with reference to the accompanying drawing, the single feature of which is a flow sheet illustration of specific embodiments thereof.

Referring to the flow sheet, it will be seen that the high density, attrition-resistant catalyst of this invention may be prepared in two preferred ways.

Thus, a partially responsive hydrated alumina may be prepared by carrying out a strike between a solution of sodium aluminate and a nitric acid solution, by simultaneously changing these solutions from separate streams so that the strike is carried out at a pH of between 8 and 9. The strike temperature is preferably maintained at between 70 and 130° F. During mixing, agitation, and preferably strong top-to-bottom mixing, is employed in the strike tank. An initial charge or heel of water should be in the reaction container prior to the addition of the acid and aluminate solutions.

The pH of the resulting alumina hydrate slurry is then preferably adjusted downward to the neutral point, where it is aged for 0.5 hour. The temperature of the aging slurry may vary between 90 and 130° F. and preferably is conducted with very gentle agitation.

Thereafter, the slurry is filtered to reduce the alkali metal content to an acceptable minimum, as for example, below 0.02%. Flocculants, such as small amounts of glue, polyacrylamide or the like, may be employed. Thereafter, the filter cake is normally washed with warm water having a temperature of about 100° F. to remove flocculants, if employed, soluble salts, acids, or other filtering aids, which may be occluded.

Such a filter cake is then ready for acid modification, and the addition of promoters, if desired, homogenization, drying and calcining.

Alternatively, a partially responsive hydrated alumina may be prepared by carrying out a strike between solutions of sodium aluminate and an aluminum sulfate solution, preferably commercial alum, by simultaneously changing of these solutions from separate streams, so that the strike is carried out over a somewhat higher pH range of between 8.5 and 10. Other conditions maintained during the strike, such as temperature, agitation and the presence of an initial charge of water in the strike tank, are substantially the same as employed in the nitric acid-sodium aluminate system.

The pH of the resulting slurry is then adjusted upward to a value between 10 and 11, but higher than the pH of the strike, and aged for 0.5 hour. Aging is preferably carried out at a temperature of from between 90 and 130° F. and preferably is conducted with very gentle agitation.

The slurry is then filtered to reduce alkali metal and sulfate content, and filtering aids such as the type described above may be employed and reslurried. Thereafter, the pH of the reslurried filter cake is adjusted, preferably to the neutral point, as with nitric acid, aged for an additional time period, as for example, 0.5 hour, and filtered. Filtration aids other than the acid referred to above may, of course, be employed. Thereafter, the filtrate may be washed in the manner described above. Normally, two filtrations are sufficient to reduce the alkali metal sulfate content, other soluble salts and acids, and filtering aids to an acceptable level. If insufficient removal is obtained, obviously additional filtrations may be made.

The alumina hydrate filter cake prepared by either of the above processes is partially responsive to homogenization and is ready for the addition of the preferred nitric acid and, if desired, promoters. To this hydrated gel filter cake there is added from between 0.1 and 0.4 mole of nitric acid per mole of $Al_2O_3$ in the final catalyst composition.

If desired, various promoters may be added at this stage in the process, and as illustrated in the flow sheet, sufficient chromic acid, sodium, potassium or ammonium chromates, or dichromates and chromium nitrate may be added to provide from between 10 and 30% of chromium oxide by weight in the final catalyst composition. Such a composition may be further activated and stabilized by the addition of from 1–3% of potassium oxide, and 2–6% of silica. These materials may be introduced into the catalyst composition as potassium dichromate and potassium silicate, or by other compatible materials, reducible to potassium oxide and silica, through the action of heat.

The activated, acid-modified alumina hydrate is then passed through a suitable homogenizing or grinding mechanism. A suitable device might consist of a high pressure pump followed by a spring-loaded homogenizing valve. The pump, which is preferably the piston type capable of generating pressures up to about 3,000 lbs. per square inch and the pressure across the homogenizing valve, should be adjustable so that the extent of homogenization can be controlled. The degree of homogenization necessary to produce a suitable final product as measured by the pressure drop across the homogenizing valve is from between 300 and 3,000 lbs. per square inch, and preferably from between 500 and 1,500 lbs. per square inch.

The homogenized material may then be dried to produce a fluid type catalyst material having an ABD of at least 0.8 cc. per gram when calcined. This is preferably accomplished by spray drying the homogenized catalyst material. Spray drying may be accomplished by employing a spray drier of the type described in U.S. Patent No. 2,644,516, to produce a chromium oxide activated alumina base dehydrogenation catalyst gel material, in the form of microspheres, having a highly uniform particle size.

Thereafter, the spray-dried catalyst may be calcined, as for example, by employing temperatures of from between 1150 and 1250° F. for from 1 to 2 hours, and until all of the activator materials are converted to their oxides.

In order that the present invention may be more fully understood, the following examples are given primarily by way of illustration. No enumerations of detail therein should be construed as limitations on the present invention, except as they appear in the appended claims. All parts and percentages are by weight unless otherwise specifically designated.

EXAMPLE 1

Spray-dried alumina was prepared in accordance with the generally outlined procedure hereinabove, using as reagents a sodium aluminate solution containing 29% $Al_2O_3$ and 31% aqueous nitric acid. A heel of water was placed in a strike tank, the agitator was started and stoichiometrically equivalent quantities of aluminate and acid solutions were simultaneously run into the strike tank along with a sufficient amount of water to maintain the solids at 7% and at such a rate as to maintain the pH value in the tank between 9 and 10. The strike temperature was maintained between 80 and 100° F. by means of suitable cooling coils. The slurry was then placed in a suitable ageing tank and the pH adjusted to 7, at which pH the batch was aged for 30 minutes at a temperature of between 100 and 120° F. It was then filtered and the filter cake was washed at the same pH, using three displacements of 100° F. deionized water.

Portions of the washed filter cake were pumped directly into a spray drier, while other portions were homogenized by passing between a spring-loaded homogenizing valve and its seat, the extent of homogenization being controlled by adjustment of pressure on the spring. In the spray drier, the slurry was ejected through a stationary nozzle into a descending rotating column of gases having an inlet temperature of about 600 to 700° F., an outlet temperature of about 250° F., and dried to a heat-set gel having a moisture content of about 20–25%, as measured by loss on ignition.

When the pH of the strike was 9.1, the apparent bulk density of the spray-dried unhomogenized alumina was 0.2 gram per cc. This was increased to 0.3 by homogenizing at 2000 lbs. pressure drop across the homogenizing valve. With a strike pH of 9.3, the ABD of the spray-dried material was 0.24 without homozenization and 0.60 after homogenization at 2000 lbs.

EXAMPLE 2

Spray-dried alumina was prepared by the process described in Example 1, using a corresponding quantity of aluminum sulfate solution as the acidifying agent instead of nitric acid. These reagents were added simultaneously to a heel of water in a suitable strike tank, together with sufficient water to maintain the strike solids at 7%, while holding the temperature between 80° F. and 110° F. The rates of addition were such that the strike pH was constant at 9.5. The pH of the slurry was adjusted to 10.5 and aged for 0.5 hour.

Thereafter, two filtrations were used in order to reduce the sulfate and sodium ions to an acceptable level. The first filtrate was washed with three displacements of water to remove these undesirable impurities. The filter cake was reslurried in water in a reslurry tank to a 7% solids content, and its pH was adjusted to 7, using nitric acid to avoid the introduction of sulfate ion. A filtering aid was also added at this point. The alumina slurry was then passed over a second filter and washed with three displacements of pure water. The filter cake was pumped into a suitable feed tank and part of the slurry was homogenized and spray dried as in Example 1 and its ABD in grams per cc. was determined. The remainder was spray dried under similar conditions without comminution by homogenization.

The ABD of the alumina homogenized at 550 lbs. pressure drop was 0.65. With 1000 lbs. homogenization pressure it was 0.86. The portion dried without homogenization had an ABD of 0.35.

EXAMPLE 3

A sodium aluminate solution was prepared by digesting 100 parts of B.O.C. (crystalline aluminum trihydrate containing 65% $Al_2O_3$) with 117 parts of 50% NaOH solution at 200–240° F. 750 parts of water was charged to an agitated vessel and the above solution added in a thin stream simultaneously with 314 parts of 31% $HNO_3$ at a pH of 8.4–8.6. The resulting slurry, containing 4.7% $Al_2O_3$, was aged at a pH of 7.0 for ½ hour, then filtered and washed with demineralized water to a sodium salt content of less than 0.02% $Na_2O$ on a solids basis. The filter cake contained 10.5% solids by weight.

To 200 parts of this filter cake there was added 18.7 parts of a 15% ammonium molybdate solution which had been heated to 70° C. The solids content of this catalyst composition is 90% $Al_2O_3$ and 10% $MoO_3$. Spray drying was done at a line pressure of 300 p.s.i. and with no homogenization. The density of the spray-dried catalyst was 0.31 gram per cc. At 2500 p.s.i. homogenization, the density was 0.39 gram per cc.

EXAMPLE 4

To 200 parts of filter cake prepared as in Example 3 there was added 2.1 parts of 31% nitric acid at room temperature. This was equivalent to 0.05 mole acid per mole of alumina. After thorough mixing, 18.7 parts of a 15% ammonium molybdate solution was added. At a line pressure of 300 p.s.i. and without homogenization, the density of the spray-dried catalyst was 0.31 gram per cc. When the catalyst material was homogenized employing 2500 p.s.i. homogenization, density was 0.40 gram per cc.

EXAMPLE 5

To 160 parts of filter cake prepared as in Example 3, there was added 5.0 parts of 31% nirtic acid. This is equivalent to 0.15 mole per mole of $Al_2O_3$. 15.0 parts of 15% ammonium molybdate solution was added and thoroughly mixed with the filter cake. This corresponded to a final catalyst composition of 90% $Al_2O_3$ and 10% $MoO_3$. When a portion of the acid-modified filter cake was spray dried without homogenization, a catalyst density of 0.67 resulted. When homogenized at 2500 p.s.i. a catalyst density of 1.02 grams per cc. resulted.

A series of examples similar to those described in Examples 3 to 5 above were carried out on a cobalt oxide-molybdic oxide catalyst containing 3% cobalt oxide and 15% molybdic oxide. Similar results were achieved.

EXAMPLE 6

A sodium aluminate solution was prepared by digesting 146 parts of bauxite ore concentrate (65% $Al_2O_3$) with 169 parts of a 50% NaOH solution at 200–240° F. 853 parts of water was charged into a vessel equipped with an agitator, and the above solution was added in a thin stream simultaneously with 430 parts of a 34% aqueous alum solution. The alum was of commercial grade and contained 16.75% $Al_2O_3$. The pH of precipitation was maintained at 9.1–9.3. The resulting slurry contained 7.1% $Al_2O_3$.

After ageing at a pH of 10.0 for ½ hour, the slurry was filtered and 870 parts of the resulting filter cake, which was at 14.4% solids, was reslurried. To this was added 17 parts of 31% nitric acid to lower the pH to 7.0. The resulting slurry was then filtered, washed and reslurried.

EXAMPLE 7

To 421 parts of filter cake at 14.85% $Al_2O_3$ prepared as in Example 6 was added a solution of 19.4 parts of chromic acid in 111 parts of water. The solids content of the final catalyst was 81% $Al_2O_3$ and 19% $Cr_2O_3$. The catalyst was spray dried at a line pressure of 300 p.s.i. and, with no homogenization, the spray-dried density was 0.41. When the same material was homogenized at 2500 lbs. pressure, a catalyst of 0.60 gram per cc. resulted.

EXAMPLE 8

To 200 parts of filter cake prepared as in Example 6 was added 3.0 parts of 31% nitric acid. This is equivalent to 0.05 mole $HNO_3$ per mole of $Al_2O_3$. 62 parts of a 15% chromic acid solution was added with thorough mixing. At zero p.s.i. homogenization, the catalyst density was 0.44 and at 2500 p.s.i. the density was 0.64 gram per cc. After calcination, the catalyst had a composition of 81% $Al_2O_3$ and 19% $Cr_2O_3$.

EXAMPLE 9

To 180 parts of filter cake prepared as in Example 6 was added 8.1 parts of 31% nitric acid or 0.15 mole of $HNO_3$ per mole of $Al_2O_3$. 55.8 parts of a 15% solution of chromic acid was added to the slurry. The spray-dried density obtained at zero homogenization was 0.78 gram per cc. and at 2000 p.s.i. the density was 1.12 grams per cc. After calcination, the catalyst had a composition of 81% $Al_2O_3$ and 19% $Cr_2O_3$.

In Table I set forth hereinbelow, the significance of acid modification and homogenization are illustrated. The alumina hydrate was prepared in accordance with the general principles outlined in Example 2 above, and those that are chromium oxide activated were prepared in accordance with the principles of the present invention and in a manner closely identified with that illustrated in Example 9 above.

Table I

| $\Delta p$ | Alumina | 20% $Cr_2O_3$, No Acid | 20% $Cr_2O_3$, 0.15 Mole $HNO_3$ | 20% $Cr_2O_3$, 0.30 Mole $HNO_3$ |
|---|---|---|---|---|
| 0 | 0.35 | 0.68 | 1.13 (0.96) [1] | 1.21 (1.07). |
| 1,000 | 0.86 | 1.13 (0.99) [1] | 1.23 | 1.37. |
| 2,000 | | 1.15 | 1.25 | |

$\Delta p$=pressure drop across homogenizing valve in p.s.i.
[1] Calcined ABD at 1100° F.
N.B. ABD values are for spray-dried material unless otherwise designated.

The above table indicates several important things. First, homogenization alone substantially improves the ABD of the catalyst material, provided that the base alumina has been precipitated at a pH above 9.0 and aged above 10. Secondly, the addition of acid alone without homogenization results in improved ABD, and thirdly that the homogenization of acid-modified catalyst material results in an improvement in ABD over what is produced by either of these critical steps above.

It should be noted in the above table that the promoted or activated alumina catalyst is a chromium oxide dehydrogenation catalyst in which the chromium oxide is incorporated by the addition of chromic acid. Table I indicates that the addition of chromic acid prior to the homogenization does improve the ABD of the catalyst material and results in a higher ABD than possessed by the alumina base alone, without homogenization. This is due to a peptizing effect of the chromic acid on the base alumina. However, it is important to note that the effect of the addition of relatively minor amounts of nitric acid to such catalyst composition results in a much higher ABD than such a catalyst composition without acid modification, and an ABD equal to that produced by a degree of homogenization equal to a 1000-lb. pressure drop.

As has been pointed out hereinabove, the process generally defined therein relates to the preparation of fluid type catalysts having a calcined ABD of the order of at least 0.8 gram per cc. and preferably at least 1.0 gram per cc. The amount of acid which may be employed is within the range of 0.10 up to 0.40. Smaller amounts of acid may be employed, but the effects produced thereby are relatively negligible, as will be seen from the above examples. If amounts in excess of 0.4 mole per cc. of $Al_2O_3$ are employed in the final catalyst composition, the effect produced by such large amounts does not significantly improve the apparent bulk density of the final catalyst material.

Particular homogenizing apparatus employed in the examples of the present invention as an ideal means for comminuting the catalyst composition is a valve type and is connected on its inlet side to a high pressure pump, such as a Manton-Gaulin or Scott-Williams type piston pump capable of delivering pressures up to 3000 lbs. per square inch. The alumina gel slurry from this pump passes outwardly between a spring-loaded valve and its seat and the pressure on its valve, and therefore the effective homogenizing pressure can be controlled by varying the effective spring pressure. This permits close control of the degree of homogenization of the alumina gel slurry.

We claim:

1. A method of producing a high density dehydrogenation catalyst having good attrition resistance, which comprises adding an inorganic acid selected from the group consisting of nitric acid and hydrochloric acid to a hydrated alumina in relative amounts of from between 0.1 and 0.4 mole of acid per mole of $Al_2O_3$, said hydrated alumina being prepared by filtering a precipitate from an aqueous solution of a water-soluble aluminum compound at a pH of from 8 to 10, and aged for at least 0.25 to 0.5 hour at a higher pH within the range of 7–11, impregnating said alumina hydrate with a quantity of a chromium compound selected from the group consisting of chromic acid, sodium, potassium and ammonium chromates and dichromates and chromium nitrate, such as to introduce from between 10–30% $Cr_2O_3$ on the weight of the finished catalyst, filtering and washing said impregnated hydrate, densifying said hydrated alumina by homogenization and spraying said aqueous dispersion into a current of hot gases.

2. A method of producing a high density fluid dehydrogenation catalyst having good attrition resistance, which comprises adding an inorganic acid selected from the group consisting of nitric acid and hydrochloric acid to a hydrated alumina in relative amounts of from between 0.1 and 0.4 mole of acid per mole of $Al_2O_3$, said hydrated alumina being prepared by filtering a precipitate from an aqueous solution of a water-soluble aluminum compound at a pH of 8.5 to 10, and aged for at least 0.25 to 0.5 hour at a higher pH within the range of 10–11, impregnating said alumina hydrate with a quantity of ammonium molybdate such as to introduce from between 8–20% of $MoO_3$ on the weight of the finished catalyst, filtering and washing said impregnated hydrate, densifying said hydrated alumina by homogenization and spraying said aqueous dispersion into a current of hot gases.

3. An alumina base fluid dehydrogenation catalyst having improved density and attrition resistance, comprising alumina and on a dry weight basis between 10 and 30% of chromium oxide said catalyst having an ABD of at least 0.8 cc. per gram.

4. An alumina base fluid catalyst having improved density and attrition resistance, comprising alumina and on a dry weight basis between 8 and 20% molybdic oxide said catalyst having an ABD of at least 0.8 cc. per gram.

5. A method of producing a high density fluid alumina catalyst impregnated with an activating metal compound which comprises adding an inorganic acid selected from the group consisting of nitric acid and hydrochloric acid to a hydrated alumina in relative amounts of from between 0.1 and 0.4 mole of acid per mole of $Al_2O_3$, said hydrated alumina being prepared by filtering the precipitate from an aqueous solution of a water-soluble aluminum compound at a pH from 8–10, aging said precipitate at a pH from 6.5–11 for at least 0.25 hour, densifying said acid-containing hydrated alumina by homogenization, and spraying an aqueous dispersion thereof into a current of hot gases.

6. A method of producing a high density fluid alumina catalyst impregnated with an activating metal compound which comprises adding an inorganic acid selected from the group consisting of nitric acid and hydrochloric acid to a hydrated alumina in relative amounts of from between 0.1 and 0.4 mole of acid per mole of $Al_2O_3$, said hydrated alumina being prepared by precipitating hydrated alumina from an aqueous solution of a water-soluble aluminum compound at a pH from 8.5–10, aging said precipitate for at least 0.25 hour at a higher pH within the range of 10–11, filtering and washing said aged alumina hydrate, densifying said hydrated alumina by homogenization, and spraying an aqueous dispersion thereof into a current of hot gases.

References Cited in the file of this patent

UNITED STATES PATENTS

| | | |
|---|---|---|
| 2,590,833 | Bechtold | Apr. 1, 1952 |
| 2,657,115 | Ashley | Oct. 27, 1953 |
| 2,739,944 | Kearby | Mar. 27, 1956 |
| 2,746,842 | Bloch | May 22, 1956 |
| 2,755,257 | Donovan | July 17, 1956 |
| 2,768,125 | Ashley | Oct. 23, 1956 |
| 2,800,429 | Porter | July 23, 1957 |
| 2,838,375 | Teter | June 10, 1958 |